US010664885B2

(12) United States Patent
Lee et al.

(10) Patent No.: US 10,664,885 B2
(45) Date of Patent: May 26, 2020

(54) METHOD, SYSTEM AND RECORDING MEDIUM FOR TRANSACTION PROCESSING USING REAL-TIME CONVERSATION

(71) Applicant: NAVER CORPORATION, Seongnam-si, Gyeonggi-do (KR)

(72) Inventors: Yoon Sook Lee, Seongnam-si (KR); Miyeon Kim, Seongnam-si (KR); Hyang Cheol Lee, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 1147 days.

(21) Appl. No.: 14/722,482

(22) Filed: May 27, 2015

(65) Prior Publication Data
US 2016/0247213 A1      Aug. 25, 2016

(30) Foreign Application Priority Data

Feb. 25, 2015   (KR) .................. 10-2015-0026530

(51) Int. Cl.
*G06Q 30/06*    (2012.01)
*H04L 12/58*    (2006.01)

(52) U.S. Cl.
CPC ..... *G06Q 30/0617* (2013.01); *G06Q 30/0633* (2013.01); *G06Q 30/0643* (2013.01); *H04L 51/04* (2013.01)

(58) Field of Classification Search
CPC ........... G06Q 30/0617; G06Q 30/0633; G06Q 30/0643

(Continued)

(56) References Cited

U.S. PATENT DOCUMENTS 8,046,259 B1 * 10/2011 Siegel .................... G06Q 10/10
                                                    705/14.73
8,140,402 B1 *  3/2012 Mesaros ............ G06Q 30/0222
                                                    705/26.1
(Continued)

FOREIGN PATENT DOCUMENTS

JP      2001-319137 A     11/2001
JP      2002-215975 A      8/2002
(Continued)

OTHER PUBLICATIONS

Y. Lee, "Naver to launch shopping Online to Offline (O2O) platform "Shopwindow" next month", Nov. 21, 2014, NAVER Corp., Republic of Korea, 2 pages.

(Continued)

*Primary Examiner* — Vanel Frenel
(74) *Attorney, Agent, or Firm* — Harness, Dickey & Pierce, P.L.C.

(57) ABSTRACT

A method, system, and non-transitory computer readable medium for transaction processing based on a real-time conversation are disclosed. A chat-based ordering method includes displaying a chat user interface (UI) for a first product on a service page for displaying information associated with the first product, creating a chat room for a chat between a seller associated with the product and a user in response to a selection on the chat UI on the service page, and providing an ordering capability for at least one of the first product and at least one second product through the chat room, wherein the providing includes displaying or linking information associated with the first product on the chat room.

20 Claims, 19 Drawing Sheets

(58) Field of Classification Search
USPC ..... 705/14.17, 39, 319, 7.23, 26.1; 715/716; 709/236
See application file for complete search history.

(56) References Cited

U.S. PATENT DOCUMENTS

| | | | |
|---|---|---|---|
| 9,444,774 B2* | 9/2016 | Krishna | G06F 1/329 |
| 2003/0156134 A1* | 8/2003 | Kim | G06Q 10/107 |
| | | | 715/753 |
| 2006/0095320 A1* | 5/2006 | Jones | G06Q 30/02 |
| | | | 705/14.51 |
| 2006/0178943 A1* | 8/2006 | Rollinson | G06Q 30/0601 |
| | | | 705/26.1 |
| 2007/0150368 A1* | 6/2007 | Arora | G06Q 30/02 |
| | | | 705/26.1 |
| 2008/0109296 A1* | 5/2008 | Leach | G06Q 10/02 |
| | | | 705/319 |
| 2010/0145829 A1* | 6/2010 | Bloomfield | G06Q 30/0601 |
| | | | 705/26.1 |
| 2011/0161130 A1* | 6/2011 | Whalin | G06Q 10/10 |
| | | | 705/7.18 |
| 2011/0258125 A1* | 10/2011 | Iyer | G06Q 10/10 |
| | | | 705/301 |
| 2012/0150657 A1* | 6/2012 | Rubinstein | G06Q 30/02 |
| | | | 705/14.66 |
| 2013/0097042 A1* | 4/2013 | Lee | G06Q 30/02 |
| | | | 705/26.1 |
| 2013/0238466 A1* | 9/2013 | Westphal | G06Q 30/06 |
| | | | 705/26.61 |
| 2013/0297454 A1* | 11/2013 | Eronen | G06Q 30/02 |
| | | | 705/26.61 |
| 2014/0058939 A1* | 2/2014 | Savla | G06Q 20/227 |
| | | | 705/42 |
| 2014/0082495 A1* | 3/2014 | Estes | G06F 3/0482 |
| | | | 715/716 |
| 2014/0207612 A1* | 7/2014 | Isaacson | G06Q 30/0635 |
| | | | 705/26.8 |
| 2014/0258039 A1* | 9/2014 | McDevitt | G06Q 30/0623 |
| | | | 705/26.61 |
| 2015/0310377 A1* | 10/2015 | Schlumberger | G06Q 10/063114 |
| | | | 705/7.15 |
| 2015/0379612 A1* | 12/2015 | Selinger | G06Q 30/02 |
| | | | 705/26.7 |
| 2016/0012465 A1* | 1/2016 | Sharp | G06Q 20/18 |
| | | | 705/14.17 |
| 2016/0048932 A1* | 2/2016 | McNelley | G06Q 50/01 |
| | | | 705/5 |
| 2016/0094509 A1* | 3/2016 | Ye | H04L 51/32 |
| | | | 709/206 |

FOREIGN PATENT DOCUMENTS

| | | |
|---|---|---|
| JP | 2002-288503 A | 10/2002 |
| JP | 2009-048226 | 3/2009 |
| JP | 2013-519174 A | 5/2013 |
| JP | 2013-117938 A | 6/2013 |
| JP | 2014-99143 | 5/2014 |
| KR | 20010094138 A | 10/2001 |
| KR | 20040033988 A | 4/2004 |
| KR | 100460008 B1 | 11/2004 |
| KR | 20090124775 A | 12/2009 |

OTHER PUBLICATIONS

Y. Choi, "Online to Offline (O2O) service of Naver "Shopwindow" to provide payment service", Dec. 16, 2014, NAVER Corp., Republic of Korea, 2 pages.

Korean Office Action dated Apr. 27, 2016, to corresponding Korean Application No. 10-2015-0026530.

Sera, Jung, "Online store 'Live Chatting' draws customers", Internet news article, Hankyoreh Newspaper Corp., 2006, Republic of Korea, Internet:<URL: http://www.hani.co.kr/arti/economy/customer/105721.html>.

Japanese Office Action dated Mar. 8, 2016, to corresponding Japanese Patent Application No. 2015-091996.

* cited by examiner

METHOD, SYSTEM AND RECORDING MEDIUM FOR TRANSACTION PROCESSING USING REAL-TIME CONVERSATION

CROSS-REFERENCE TO RELATED APPLICATION

This application claims priority from and the benefit of Korean Patent Application No. 10-2015-0026530, filed on Feb. 25, 2015, the disclosure of which is incorporated by herein in its entirety by reference.

BACKGROUND

Field

Example embodiments relate to transaction processing technology.

Description of the Background

With an increase in the number of Internet users, the distribution and sales of goods and services using Internet shopping malls are being actively conducted.

According to a significant increase in the number of Internet shopping malls, each Internet shopping mall is being run using a mall-in-mall method to enhance the accessibility to users. The mall-in-mall method may indicate a method that enables a user to access each Internet shopping mall through an intermediary shopping mall.

SUMMARY

Some example embodiments provide a method, system, apparatus, and/or non-transitory computer-readable medium that may provide information associated with a product and a product ordering function, capability and/or command using a real-time chat room and/or chat environment.

Some example embodiments provide a method, system, apparatus, and/or non-transitory computer-readable medium that may provide a chat-based ordering service starting from a product inquiry up to a product order through a one-to-one, one-to-several, several-to-one, or several-to-several chat.

According to at least one example embodiments, there is provided a chat-based ordering method executed by a chat-based ordering computing device comprising a processor, the method including displaying a chat user interface (UI) for a first product on a service page for displaying information associated with the first product; creating a chat room for a chat between a seller associated with the first product and a user in response to a selection on the chat UI on the service page; and providing an ordering capability configured for at least one of the first product and at least one second product through the chat room. The providing may include displaying or linking information associated with the first product on the chat room.

The providing may include providing the seller with a capability configured to create an order request for at least one of the first product and the at least one second product through the chat room and transferring the order request to the user.

The providing may include providing the seller with a capability configured to recommend, to the user, information associated with other products registered by the seller through the chat room.

The providing may include providing the seller with a capability configured to manage a reservation status of the first product through the chat room.

The providing may include providing the seller with at least one of a first capability configured to transmit content associated with the first product, a second capability configured to of transmit location information associated with the seller, and a third capability configured to transmit reward information associated with the first product through the chat room.

The providing may include providing the user with a capability configured to order the product in the order request using the chat room.

The providing may include providing the seller with at least one of a fourth capability configured to answer a message sent from the user using a software bot and a fifth capability configured to answer the message sent from the user using a message template through the chat room.

The displaying may include displaying the chat UI on an individual product page that includes information of an individual product and a search result page that includes information about a plurality of products responsive to a search.

The creating may include creating a chat room that provides real-time chat capability between the seller and the user.

According to at least one example embodiment, a non-transitory computer-readable medium may include computer readable instructions, which when executed by a processor, may configure the processor to display a chat user interface (UI) for a first product on a service page for displaying information associated with the first product, create a chat room for a chat between a seller associated with the first product and a user in response to a selection on the chat UI on the service page, and provide an ordering capability configured for at least one of the first product and at least one second product through the chat room, and the providing comprises displaying or linking information associated with the first product on the chat room. According to another aspect of at least one example embodiment, there may be provided a chat-based ordering system that may include a computing device that may include a memory having computer readable instructions stored thereon, and at least one processor that may be configured to execute the computer readable instructions to, display a chat UI for a first product on a service page for displaying information associated with the first product, create a chat room for a chat between a seller associated with the first product and a user in response to a selection on the chat UI on the service page, and provide an ordering capability configured for at least one of the first product and at least one second product through the chat room, and display or link information associated with the first product on the chat room.

The at least one processor may be configured to execute the computer readable instructions to provide the seller with a capability configured to create an order request for at least one of the first product and the at least one second product through the chat room and transferring the order request to the user.

The at least one processor may be configured to execute the computer readable instructions to provide the seller with a capability configured to recommend, to the user, information associated with other products registered by the seller through the chat room.

The at least one processor may be configured to execute the computer readable instructions to provide the seller with a capability configured to manage a reservation status of the first product through the chat room.

The at least one processor may be configured to execute the computer readable instructions to provide the seller with at least one of a first capability configured to transmit content associated with the first product, a second capability configured to transmit location information associated with the seller, and a third capability configured to transmit reward information associated with the first product through the chat room.

The at least one processor may be configured to execute the computer readable instructions to provide the user with a capability configured to order the product in the order request through the chat room.

The at least one processor may be configured to execute the computer readable instructions to provide the seller with at least one of a fourth capability configured to answer a message sent from the user using a software bot, and a fifth capability configured to answer the message sent from the user using a message template through the chat room.

The at least one processor may be configured to execute the computer readable instructions to display the chat UI on an individual product page that includes information of an individual product and a search result page that includes information about a plurality of products responsive to a search.

The chat room may provide a capability configured to transmit messages between the user and the seller as text, video and audio.

It is to be understood that both the foregoing general description and the following detailed description are explanatory and are intended to provide further explanation of the example embodiments as claimed.

According to at least one example embodiment, it is possible to configure a further convenient and active shopping service model by providing a chat-based ordering service starting from a product inquiry up to a product order using a one-to-one, one-to-several, several-to-one, or several-to-several chat.

Also, according to at least one example embodiment, it is possible to provide a shopping service environment that may achieve the reliability and satisfaction between a seller and a user by supporting a product inquiry, a photo transmission, a product recommend, and a transmission of a store location, and a product order through a chat room or chat environment associated with a desired, selected, or predetermined product.

BRIEF DESCRIPTION OF THE DRAWINGS

The foregoing and other features of the example embodiments will be apparent from the more particular description of non-limiting embodiments, as illustrated in the accompanying drawings in which like reference characters refer to like parts throughout the different views. The drawings are not necessarily to scale, emphasis instead being placed upon illustrating principles of inventive concepts. In the drawings.

DETAILED DESCRIPTION

Figure 1:
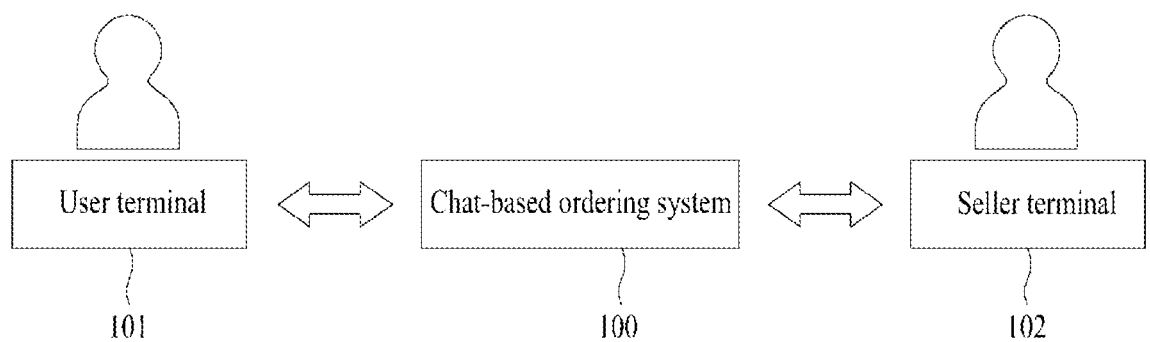
FIG. 1 is a diagram illustrating an example of a shopping service environment for a product order according to at least one example embodiment.

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of the example embodiments to those of ordinary skill in the art. In the drawings, the thicknesses of layers and regions are exaggerated for clarity. Like reference characters and/or numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein the term "and/or" includes any and all combinations of one or more of the associated listed items.

It will be understood that, although the terms "first", "second", etc. may be used herein to describe various elements, components, regions, layers and/or sections. These elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, example embodiments will be described with reference to the accompanying drawings.

At least one example embodiment relate to technology for providing information associated with a product and a product order based on and/or available through the Internet, and/or other computer or data networks, and may be applicable to a shopping service model and computing and networking infrastructure that provides a function, capability or command for relaying information between a seller and a user.

The term 'product' may inclusively indicate any type of tangible/intangible products or services that can be sold and/or purchased. The term 'order' may inclusively indicate any type of action such as a request/reservation/ask/charge made to a seller so that production, transport, and providing of a product may be performed.

FIG. 1 is a diagram illustrating an example of a shopping service computing environment for a product order according to some example embodiments. FIG. 1 illustrates a user terminal 101, a seller terminal 102, and a chat-based ordering system 100. In FIG. 1, an arrow indicator indicates that data may be transmitted and received over a wired/wireless network between constituent elements.

The user terminal 101 and the seller terminal 102 may indicate any type of terminal devices, such as a personal computer (PC), a laptop computer, a smartphone, a tablet, and a wearable computer, for example, capable of connecting to a website/mobile site associated with the chat-based ordering system 100 and/or installing and executing a service compatible and/or exclusive application associated therewith. Here, the user terminal 101 and the seller terminal 102 may perform the overall service configuration, such as a service screen configuration, a data input, a data transmission and reception, a data storage, or the like under the control of the website/mobile site and the service compatible and/or exclusive application.

The chat-based ordering system 100 may serve as a service platform that may provide a product ordering service to at least one user terminal 101 and at least one seller terminal 102 that may be clients. In particular, the chat-based ordering system 100 may provide a computer-implemented service environment in which an overall process including exchange of product information and a product order may be performed between a seller and a user. The chat-based ordering system 100 may be included in a platform of a shopping service that provides an Internet, or other computer or data network, computer-implemented shopping environment and, without being limited thereto, may be constructed as a system separate from the shopping system to provide a product ordering system in interaction with the shopping system. Here, the chat-based ordering system 100 may provide a web-based, or network-based, chat room, or chat environment, autonomously at a computer-implemented service platform. Alternatively, the chat-based ordering system 100 may use a chat room, or chat environment, on a messenger application (or a software capable of providing messaging functionality) stored on and/or installed in the user terminal 101 and the seller terminal 102 in interaction with a messenger platform that provides a messaging service. The chat-based ordering system 100 may be configured in an application form in the user terminal 101 and the seller terminal 102 and, without being limited thereto, may be included in a service platform that provides a product ordering service in a client-server, master-slave, peer-to-peer, or other like environment.

Figure 2:
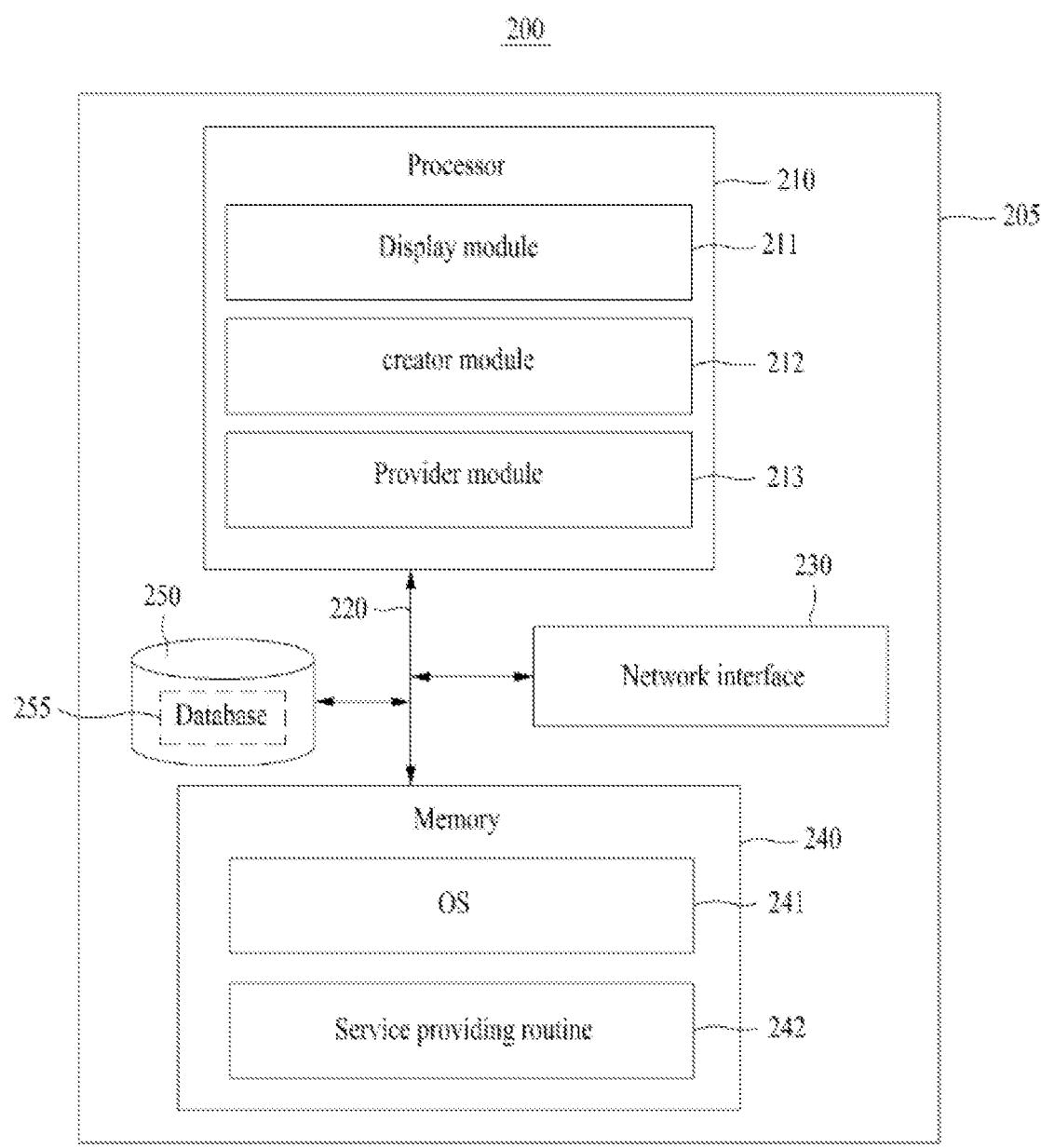
FIG. 2 is a block diagram illustrating a configuration of a chat-based ordering system according to at least one example embodiment.
Figure 3:
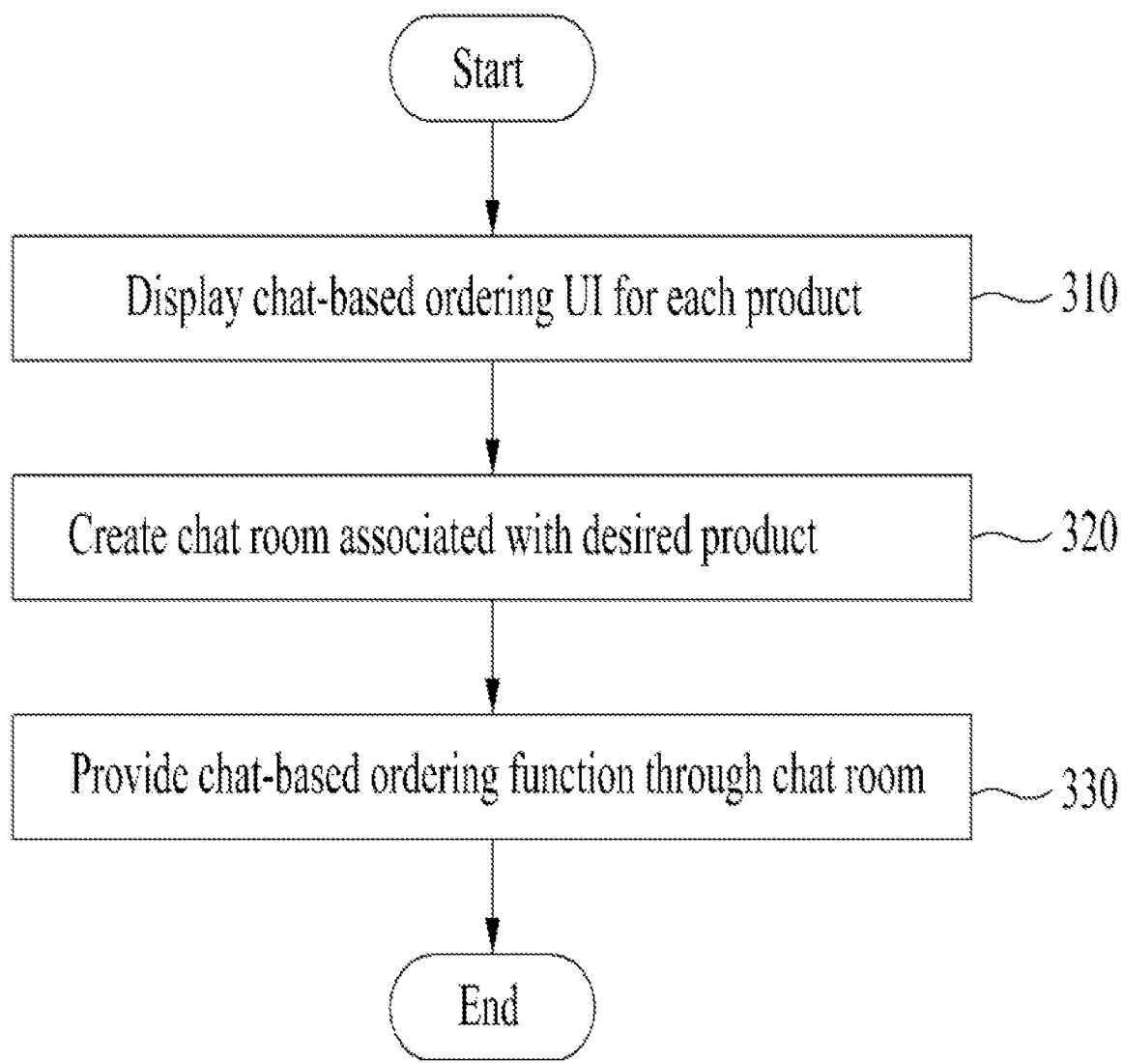
FIG. 3 is a flowchart illustrating a chat-based ordering method according to at least one example embodiment.

FIG. 2 is a block diagram illustrating a configuration of a chat-based ordering system according to some example embodiments, and FIG. 3 is a flowchart illustrating a chat-based ordering method according to some example embodiments.

Referring to FIG. 2, the chat-based ordering system 200 may include at least one computing device, e.g., a server 205. The server 205 may include at least one processor 210, a bus 220, a network interface 230, a memory 240, and a storage device 250 that may store one or more databases, such as database 255. The server 205 may employ one or more connection-oriented protocols such as Session Initiation Protocol (SIP), HTTP, and TCP/IP, and includes network devices that use connectionless protocols such as User Datagram Protocol (UDP) and Internet Packet Exchange (IPX). The database 255 may also be stored in memory 240, and/or may be stored on a separate computing device (not shown) accessible via the network interface 230.

The memory 240 may include an operating system (OS) 241 and a service providing routine 242. The processor 210 be configured to process computer readable instructions of, for example, a computer program by performing a basic arithmetic and logic operation, and an input/output (I/O) operation of the map providing system 300, thereby transforming the processor 210 into a special purpose processor. The computer readable instructions may be stored on the memory 240 or other memory. The processor 210 may be configured to execute the computer readable instructions as one or more program modules, such as the display module 211, the creator module 212, and/or the provider module 213. According to other example embodiments, the chat-based ordering system 200 may include a more number of constituent elements than the number of constituent elements of FIG. 2.

The memory 240 may include a permanent mass storage device, such as a random access memory (RAM), a real only memory (ROM), and a disc drive, as a computer-readable storage medium. Also, program modules for the OS 241 and the service providing routine 242, and the like, may be stored in the memory 240. Such software constituent elements may be loaded from another computer-readable storage medium separate from the memory 240 using a drive mechanism (not shown). The other computer-readable storage medium may include, for example, a floppy drive, a disc, a tape, a DVD/CD-ROM drive, and a memory card. Software constituent elements may be loaded to the memory 240 through the network interface 230 instead of using the computer-readable storage medium.

The bus 220 enables communication and data transmission between the constituent elements of the chat-based ordering system 200. The bus 220 may be configured using a high-speed serial bus, a parallel bus, a storage area network (SAN), and/or another appropriate communication technology.

The network interface 230 may be a computer hardware constituent element for connecting the chat-based ordering system 200 to the computer network. The network interface 230 may connect the chat-based ordering system 200 to the computer network through a wireless or wired connection.

The database 250 may be configured to store and maintain information desired, useful, and/or required in providing a product ordering service. The database 250 may maintain individual information, for example, an identifier (ID)/password (PW) of a user and at least one seller to provide a chat room in which the user and the seller(s) that are desired and/or allowed to have a chat, and may maintain information about a product registered by the seller(s). Here, the product information may indicate all of the contents registered by the seller(s) associated with the product, for example, a product image, a product price, a product description, link information, seller information, and a product category. Although FIG. 2 illustrates that the database 250 is included in the chat-based ordering system 200, it is only an example. Accordingly, all of, or a portion of, the one or more databases may be present as an external database constructed on a separate system. Additionally, in various example embodiments, the one or more databases may include a database management system ("DBMS"), a relational database management system ("RDBMS") database, an object database ("ODBMS"), column-oriented DBMS, correlation database DBMS, and/or other like database management systems.

When executed by a processor, such as the processor 210, the computer readable instructions associated with the display module 211, the creator module 212, and/or the provider module 213 may specially configure the processor to perform operations 310 through 330 of FIG. 3.

Referring to FIG. 3, in operation 310, the display module 211 includes instructions that cause the display, on a service page for displaying products, a user interface (UI) corresponding to a chat-based ordering function, capability and/or command as interaction for providing a product order channel using a chat for each product. Here, the service page may indicate various types of service screens that may be provided from a computer-implemented platform to which product information of a seller may be registered, by including a shopping service, an integrated search service, a separate search engine, a community service, a café/blog service, an auction service, and/or a social networking service (SNS). The service page, as a service screen for displaying a product of the seller, may include an individual product page for displaying details information of a desired (or, alternatively predetermined) product and a total product page for sorting and thereby displaying at least one product as a list, for example a list of products based on a desired (or, alternatively predetermined) criterion, such as search results that result from the user's search query transmitted to the integrated search service or to a separate search engine website. That is, the display module 211 may also include instructions that cause the display of a UI for making a chat-based order for each product displayed on the service page.

In operation 320, the creator module 212 may include instructions to create a chat room associated with a desired (or, alternatively predetermined) product when the user executes a chat-based ordering function, capability and/or command with respect to the product. For example, when a UI for ordering a desired (or, alternatively predetermined) product using a chat is selected, the creator module 212 may create a webpage, messaging application instance, video conference session, audio conference session, or the like, (hereinafter, a chat room) for a real-time chat between a seller having registered the product and a user having requested the chat-based order.

In operation 330, the provider module 213 may include instructions to provide the chat room associated with the product to the seller and the user at the same time, and may also provide a chat-based ordering function, capability and/or command based on a real-time chat between the seller and the user through the chat room. In this example, the chat-based ordering function, capability and/or command through the chat room may provide a real-time chat environment in which information may be exchanged between the seller and the user and the user may order a desired (or, alternatively predetermined) product having triggered creation of the chat room and/or another product, including additional products that may be recommended by the seller.

The provider module 213 may include instructions to provide a function, capability and/or command available from the chat room for each of the seller and the user. The chat room may include, as a basic communication function, capability and/or command, a message function, capability and/or command capable of sending and receiving a message using a text, video, or audio, a free call function, capability and/or command capable of providing a wired or wireless Internet, or other network based, phone, or video conference, service. Such functions, capabilities and/or commands may be provided to both the seller and the user. The chat room for the seller may include a file transmission function, capability and/or command capable of transmitting a photo, a video, an image associated with a product, or the like; a location transmission function, capability and/or command capable of transmitting location information, for example, an offline store location associated with the seller using a map, directions to the offline store based on the user's current location, or the like; a product recommendation function, capability and/or command capable of recommending other products in addition to a product desired, selected or determined by the user; an order information transfer function, capability and/or command capable of creating and transferring an order request (e.g., an order form) that includes desired, useful, and/or required for a product payment; and a reward providing function, capability and/or command capable of providing a variety of reward information, for example, a discount, a coupon, a free delivery offer, or the like. Functions, capabilities and/or commands included in the chat room for the seller may be configured to be different based on the field of business of the seller, or based on the product type, such as, a product category. For example, in the case of an accommodation facility, such as a hotel, a camping site, and an airline, or the like, a reservation management function, capability and/or command capable of managing a reservation, such as a current reservation status, through a calendar or other scheduler in association with a reservation solution may be included in the chat room. The chat room for the user may include an ordering function, capability and/or command capable of ordering a product based on product information included in an order request. Here, the ordering function, capability and/or command may include a payment function, capability and/or command or may support a connection to the payment function in interaction with a separate payment system.

The provider module 213 may include instructions to provide a chat room between the user and the seller, the user and several sellers, several users and the seller, or several users and several sellers, and may also link or display information about a desired, selected (or, alternatively predetermined) product having triggered the creation of the chat room using a variety of methods. For example, the provider module 213 may include instructions to provide, automatically or otherwise, a description of a product desired to be ordered by the user by displaying information about the product selected by the user through a UI for a chat-based order on the chat room. Further, the provider module 213 may include instructions to provide the seller with a function, capability and/or command of answering, automatically or otherwise, a message sent from the user using a software bot, or artificial intelligence, and a function, capability and/or command of automatically or selectively answering a message sent from the user using a desired, predicted, selected and/or pre-created message by, for example, analyzing a message sent by the user and using predictive algorithms to provide a response, or using a message template, or the like, through the chat room between the user and the seller.

Figure 4:
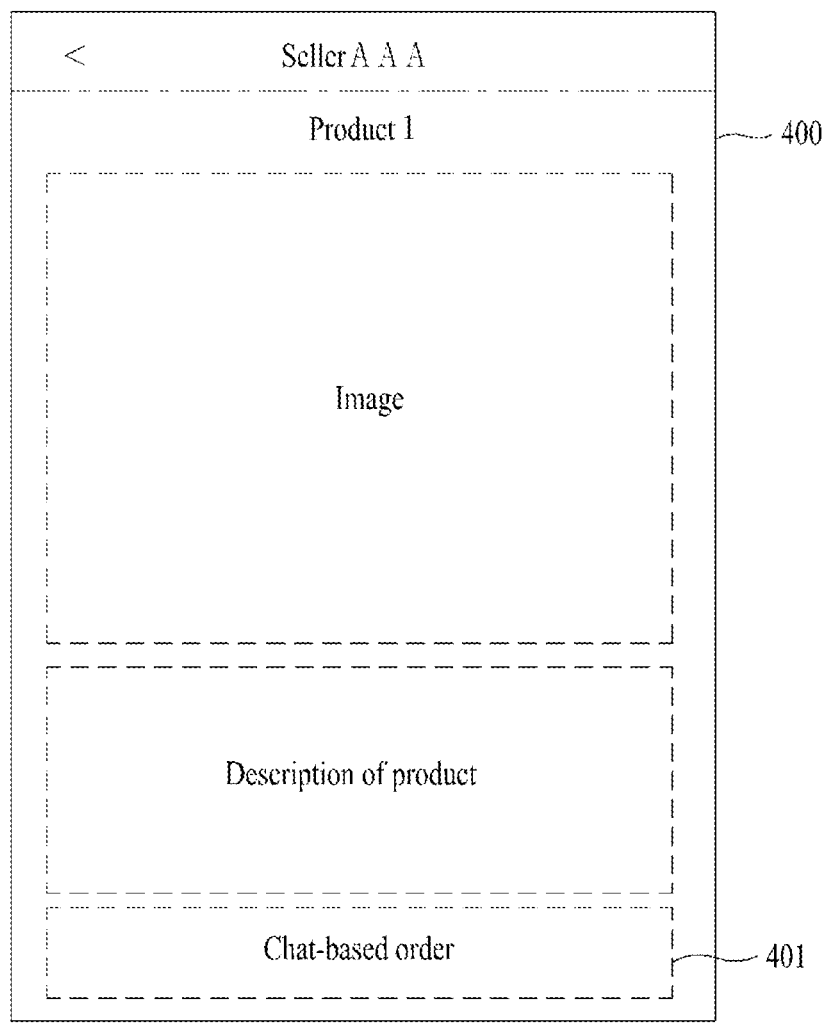
FIGS. 4 and 5 illustrate examples of a product display process according to at least one example embodiment.
Figure 5:
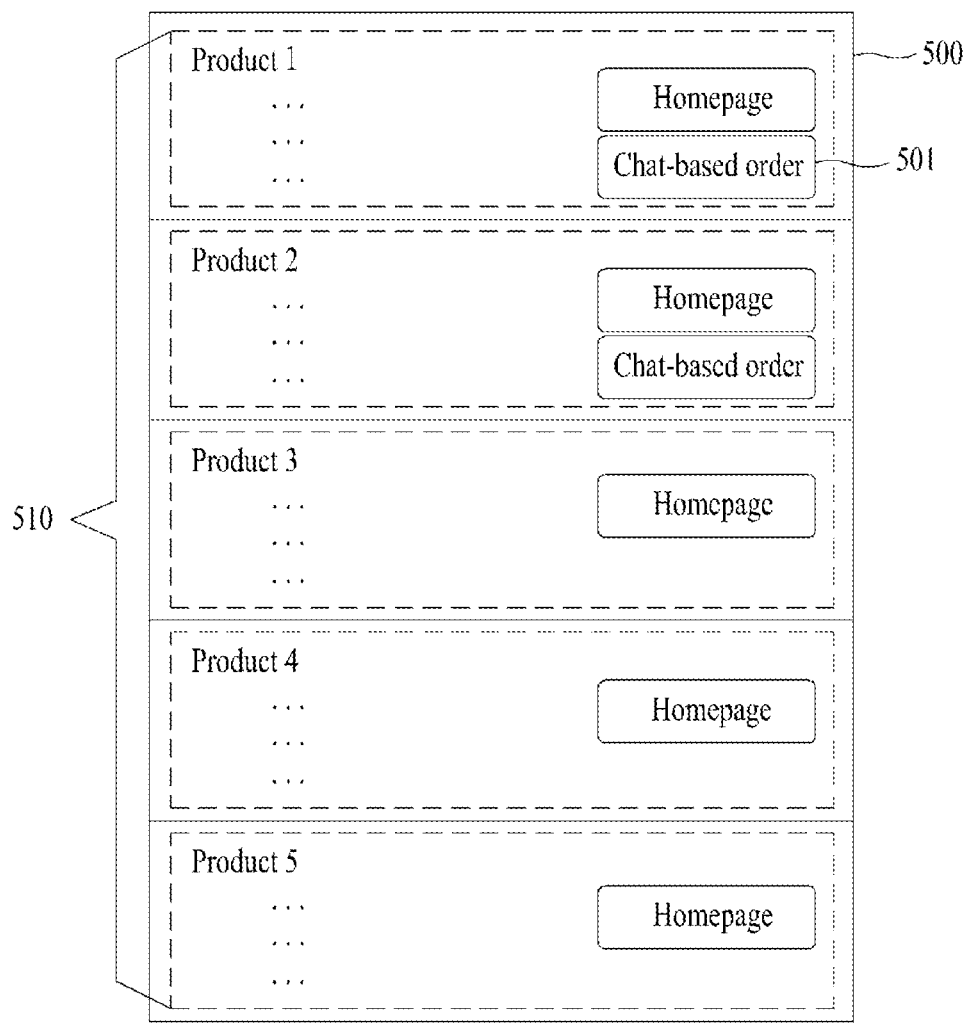

FIGS. 4 and 5 illustrate examples of a product display process according to an example embodiment.

FIG. 4 illustrates an individual product page 400 on which details information of a desired, selected, and/or predetermined product, for example, product 1 may be displayed. A user may connect to the individual product page 400 through a variety of channels such as a shopping service, an integrated search service, a separate search engine, a community service, a café/blog service, an auction service, and/or an SNS.

Referring to FIG. 4, details and/or information associated with a desired, selected, and/or predetermined product may be displayed on the individual product page 400. The details and/or information may be, for example, a product image, a product price, a product description, seller information, and/or a product category. A chat-based order menu 401 for a product inquiry to a product order through a one-to-one, one-to-several, several-to-one, or several-to-several chat with a seller with respect to the product may also be displayed on the individual product page 400.

FIG. 5 illustrates an integrated product page 500 on which a product list (e.g., a catalog, an inventory, an index, a directory, or the like) may be displayed. For example, a plurality of products may be configured and displayed as a list 510 on the integrated product page 500 as a search result. A user may connect to the integrated product page 500 on which the plurality of products may be displayed through a search function provided from, for example, a shopping service, an integrated search service, a separate search engine, a community service, a café/blog service, an auction service, and/or an SNS.

Referring to FIG. 5, the list 510 of products may be displayed on the integrated product page 500. A chat-based order menu 501 for a product inquiry through a product order through a one-to-one, one-to-several, several-to-one, or several-to-several chat with a seller with respect to each of the products included in the list 510 may be displayed on the integrated product page 500.

Product information displayed on the individual product page 400 and the integrated product page 500 may be linked to information about a corresponding seller and accordingly, the chat-based order menus 401 and 501 may be displayed on the individual product page 400 and the integrated product page 500, respectively, with respect to a product of the seller. Here, the chat-based order menus 401 and 501 may be configured to immediately call a chat room for a real-time chat between the seller of the linked product and the user.

FIGS. 6 through 18 illustrate examples of a product order process through a chat according to an example embodiment.

Figure 6:
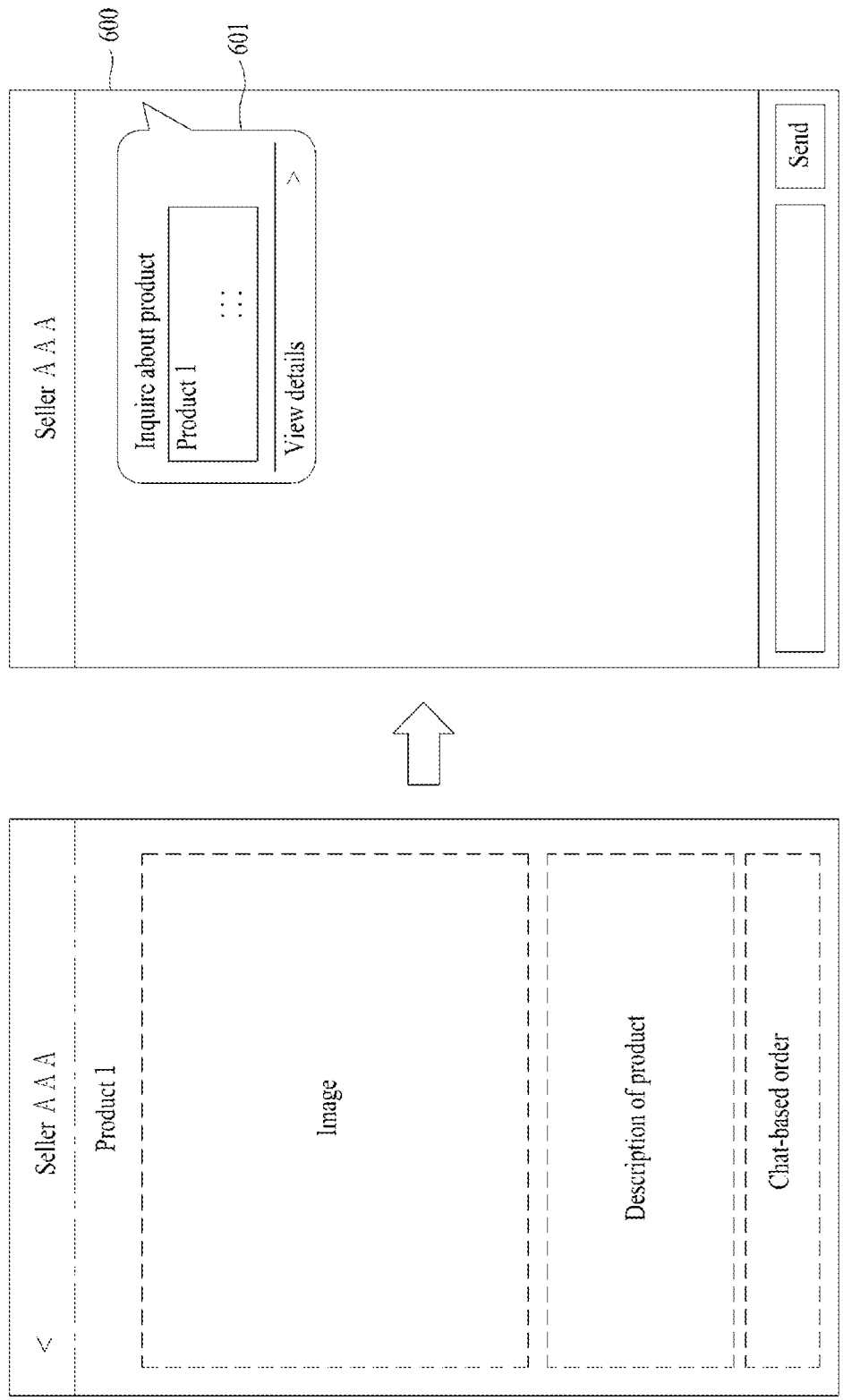
FIGS. 6 through 18 illustrate examples of a product order process through a chat according to at least one example embodiment.

Referring to FIG. 6, when a user selects a chat-based order menu displayed together with a product on a service screen on which the product is displayed, a chat room 600 for a real-time chat between a seller of the product and the user may be provided. The chat room 600 may provide a one-time communication function, capability and/or command that allows a chat during a conversation session being maintained at a website.

Product information 601 about a desired, selected and/or predetermined product may be displayed, automatically or otherwise, on the chat room 600 in response to a selection of the user on the chat-based order menu, or other UI element, which may lead the user to connect, automatically or otherwise, to a description or other information of the product desired by the user. For example, the product information 601 displayed on the chat room 600 may include a link that may direct or connect the user to a website linked to the product.

Figure 7:
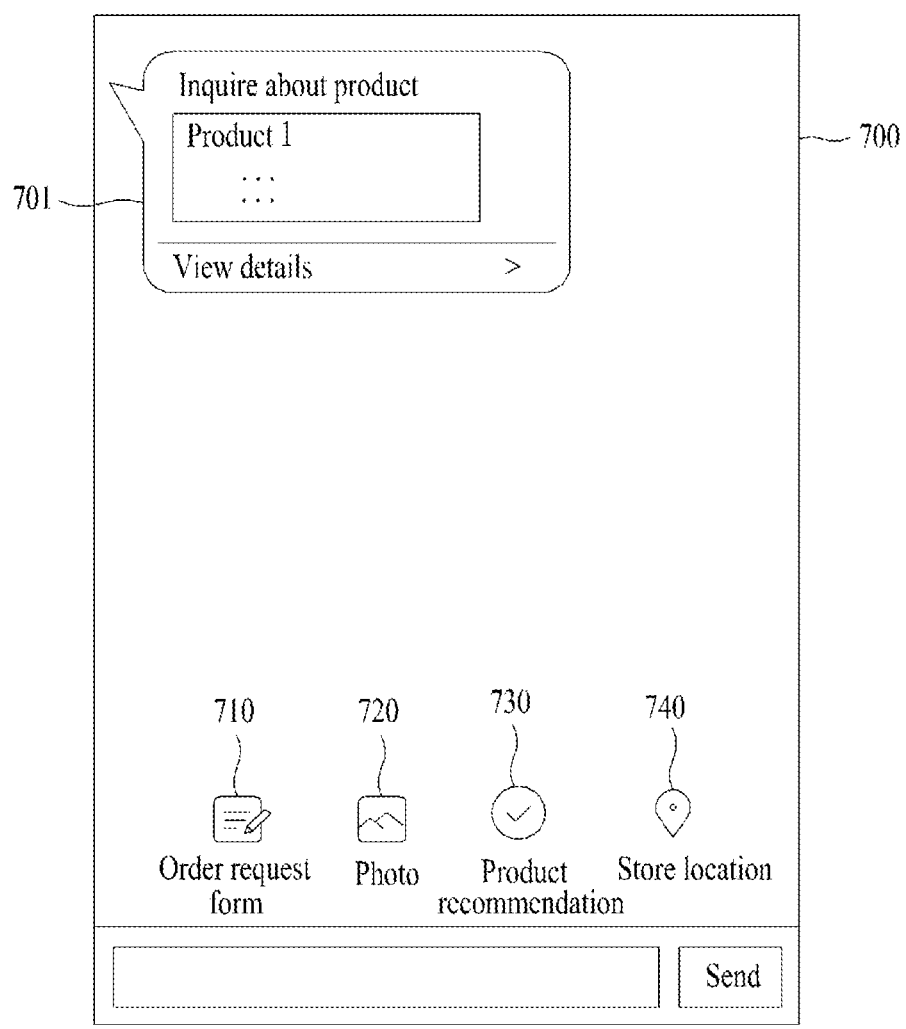
Figure 8:
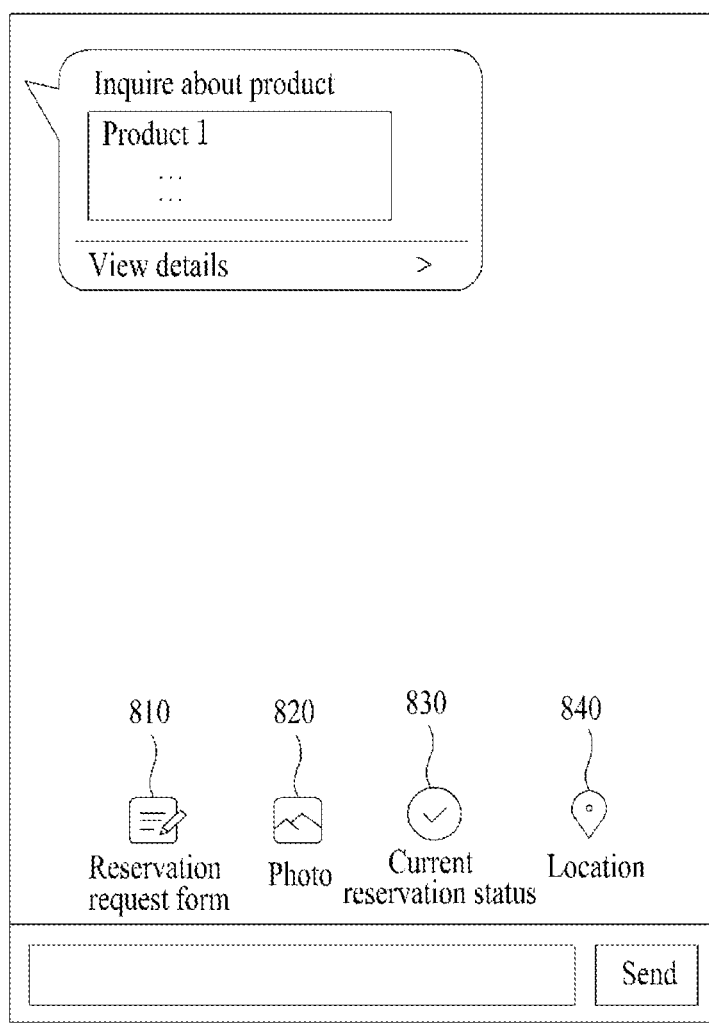

FIG. 7 illustrates an example of a chat room for a seller that is a conversation screen of a seller side according to an example embodiment.

Referring to FIG. 7, the chat room 700 for the seller enables product information 701 about a product desired, selected, and/or determined by a user to be displayed, automatically or otherwise, at the same time of being provided to the seller. Accordingly, the seller may verify the description and/or information associated with the product that the user is to inquire about.

In particular, in addition to a basic communication function, capability and/or command capable of exchanging a message using text, video, and/or audio, the chat room 700 for the seller may include an order request menu, or other UI element, 710 for creating and transferring order request information, i.e., an order request form or the like, desired and/or required for a product payment, a photo menu, or other UI element, 720 for transmitting a photo, an image, a video, or the like, associated with a product, a product recommendation menu, or other UI element, 730 for recommending other products in addition to the product desired, selected, and/or determined by the user, and a store location menu, or other UI element, 740 for transmitting a store location using a map, transmitting directions from the user's current location to the store location, transmitting the store's address, or the like.

For example, when a seller receives a product order in a reservation request, form, or the like, a chat room for the seller may be provided using a chat environment for a reservation related inquiry and a reservation confirmation. For example, referring to FIG. 8, the chat room for the seller may include a reservation request form menu, or other UI element, 810 for creating and transferring a reservation request information, (e.g., a reservation request form) that includes desired, useful, and/or required for reservation confirmation, a photo menu, or other UI element, 820 for transmitting a photo, an image, a video, or the like associated with a product, a reservation status menu, or other UI element, 830 for managing a current reservation status through a calendar or a schedule, and a location menu, or other UI element, 840 for transmitting a visiting location using a map, transmitting directions from the user's current location to the store location, transmitting the store's address, or the like.

Figure 9:
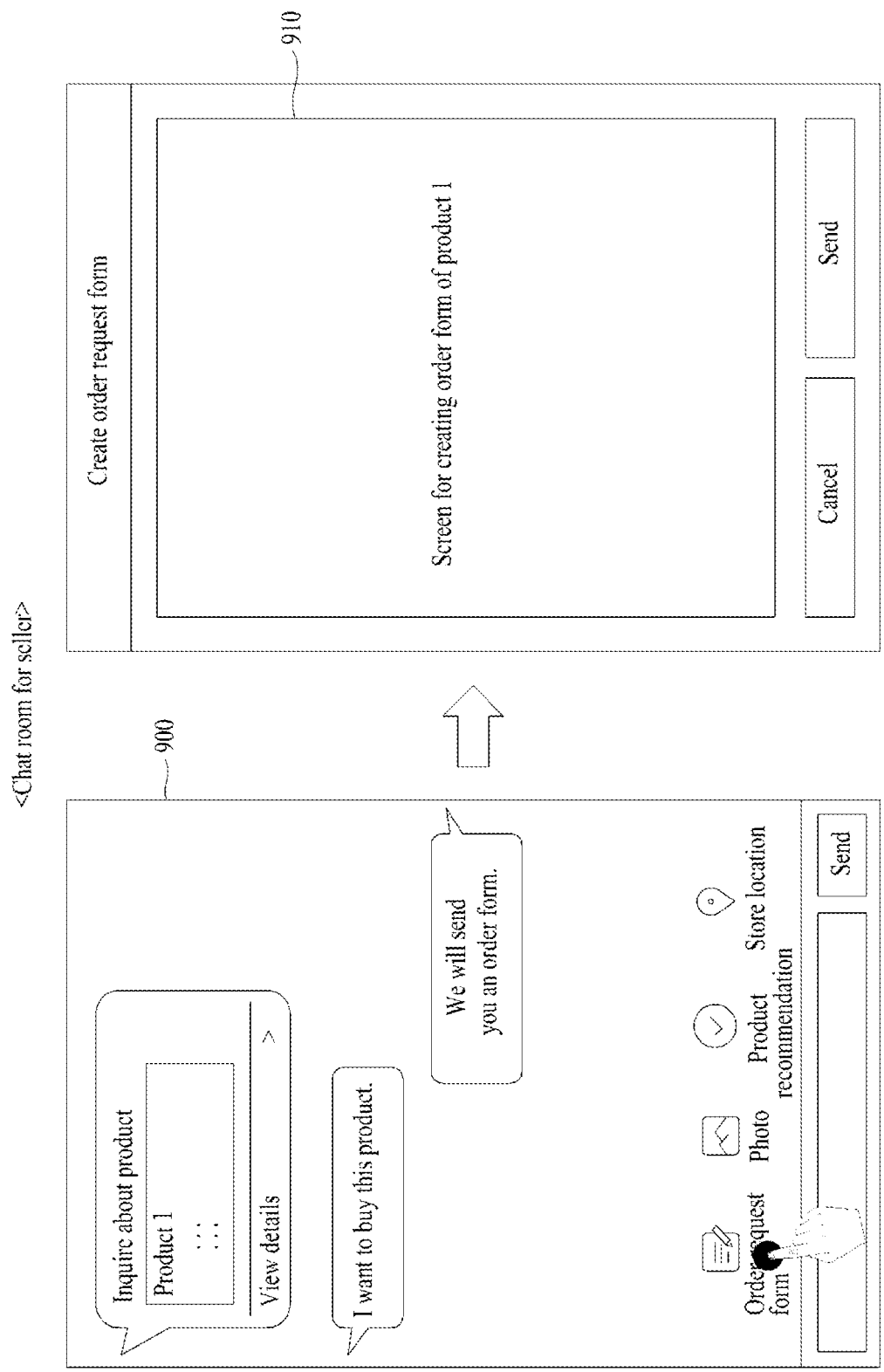
Figure 10:
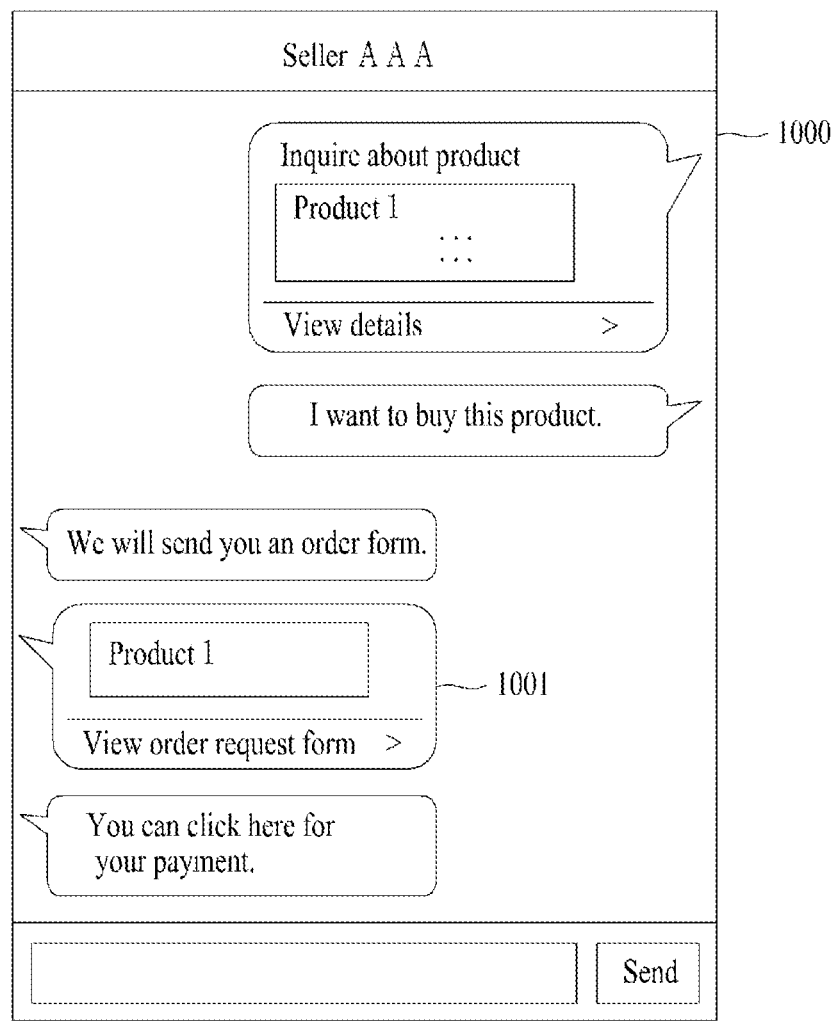

FIGS. 9 and 10 illustrate an example of a process of ordering a product through a chat room according to an example embodiment.

Referring to FIG. 9, when a seller selects an order request menu (or other UI element) in a chat room 900 in response to a product purchase intent of a user, the chat-based ordering system may provide a screen 910 for creating an order request (e.g., an order request form) through the chat room 900. For example, the chat-based ordering system may create an order request (e.g., an order request form) that includes desired, useful, and/or required for a payment of a product linked to the chat room 900 in response to a request of the seller or for a payment of a product selected by the seller through the order creation screen 910 and may transmit the created order request information (e.g., a created order request form) to a user.

Referring to FIG. 10, a user may receive an order request form 1001 of a product that the user is to purchase through a chat room 1000 created between the user and a seller, and may perform a payment after inputting ordering person information through the order request 1001 in the chat room 1000.

Figure 11:
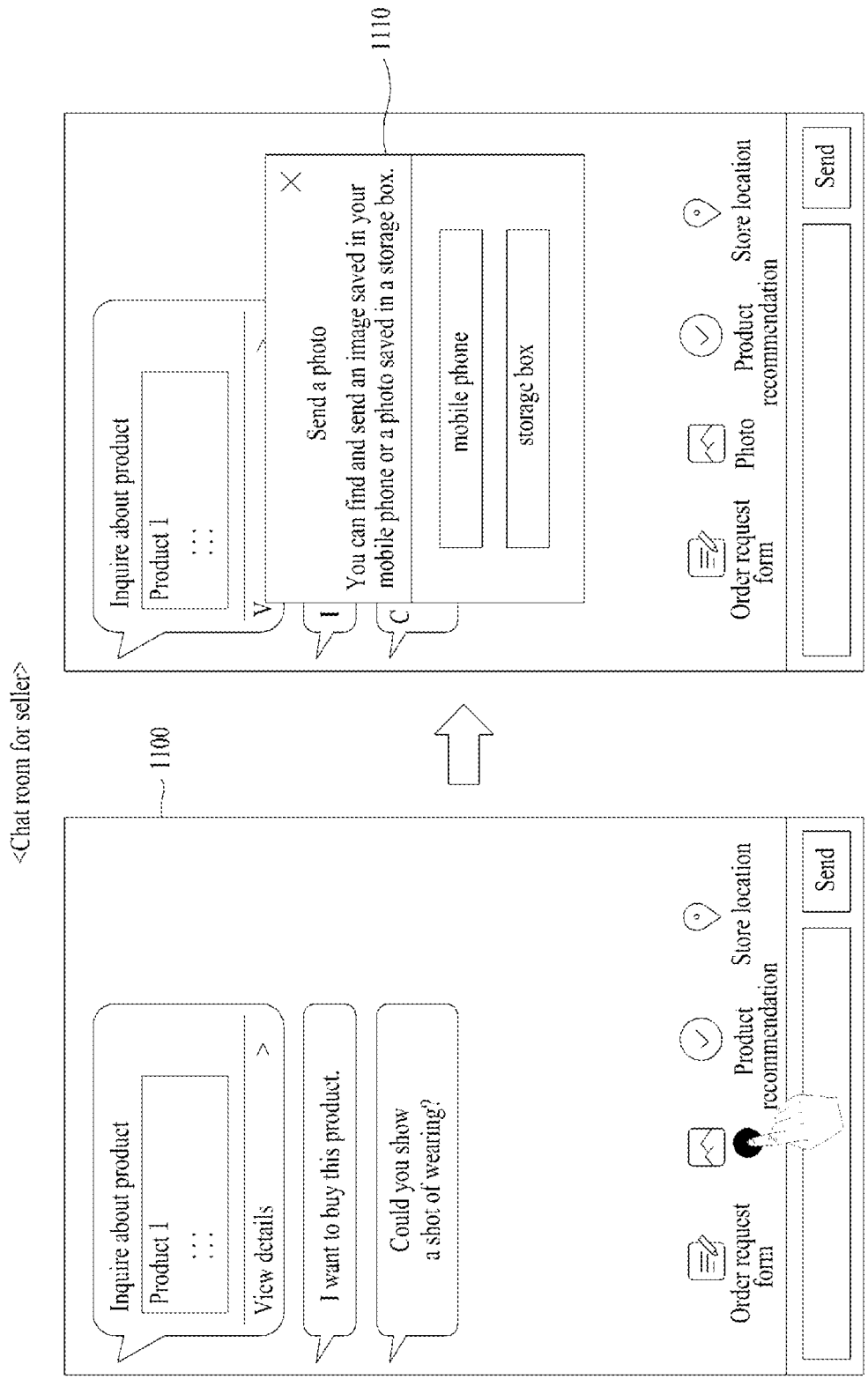
Figure 12:
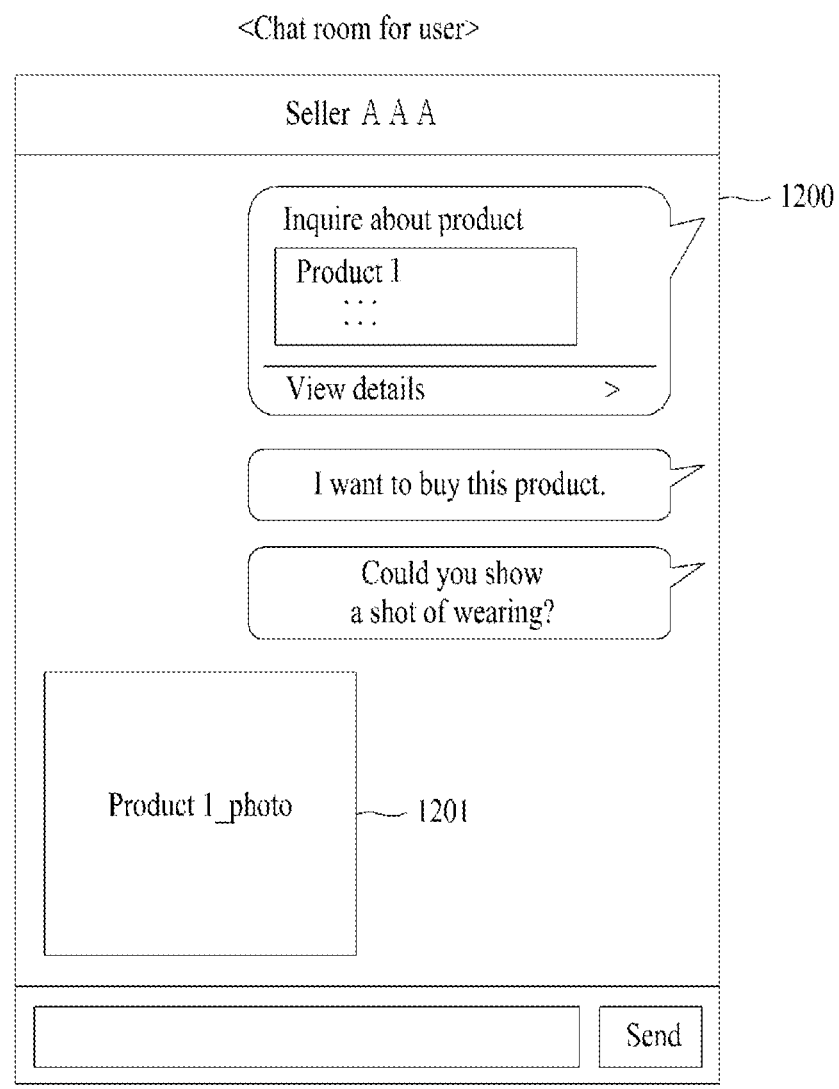

FIGS. 11 and 12 illustrate an example of a process of transmitting a photo through a chat room according to an example embodiment.

Referring to FIG. 11, when a seller selects a photo menu in the chat room 1100 to transmit a photo of a product a user has inquired about, the chat-based ordering system may provide a photo transmission screen 1110 for transmitting a photo through the chat room 1100. Here, the photo transmission screen 1110 may include a menu, or the like, for selecting a photo selection channel. For example, a function, capability, and/or command capable of selecting an image stored in a local area of a seller terminal or an image box, for example, a database, of the chat-based ordering system may be provided.

Referring to FIG. 12, a user may receive a photo 1201 of a product the user has inquired about from a seller through a chat room 1200 created between the user and the seller and may verify the product from the photo 1201.

Figure 13:
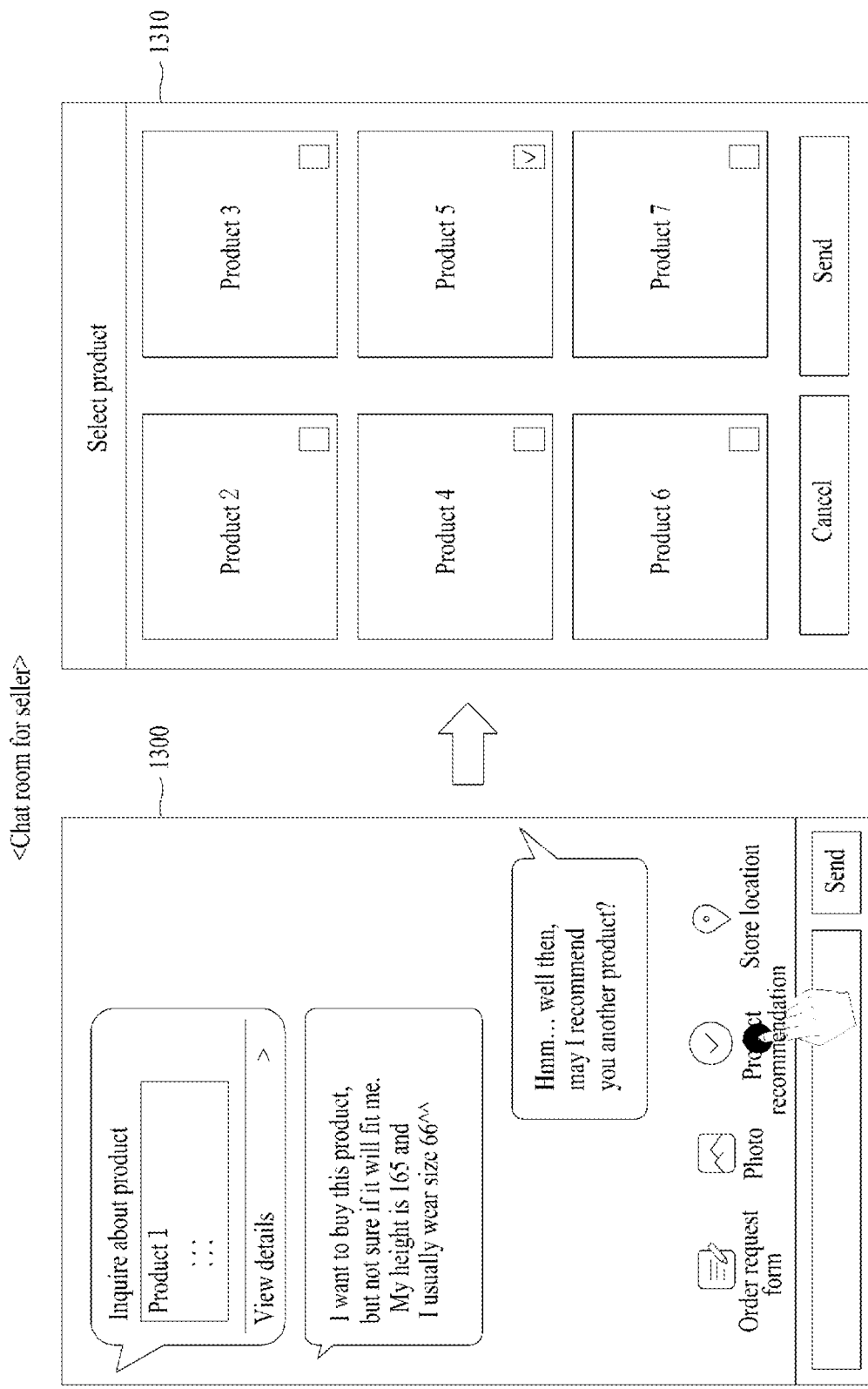
Figure 14:
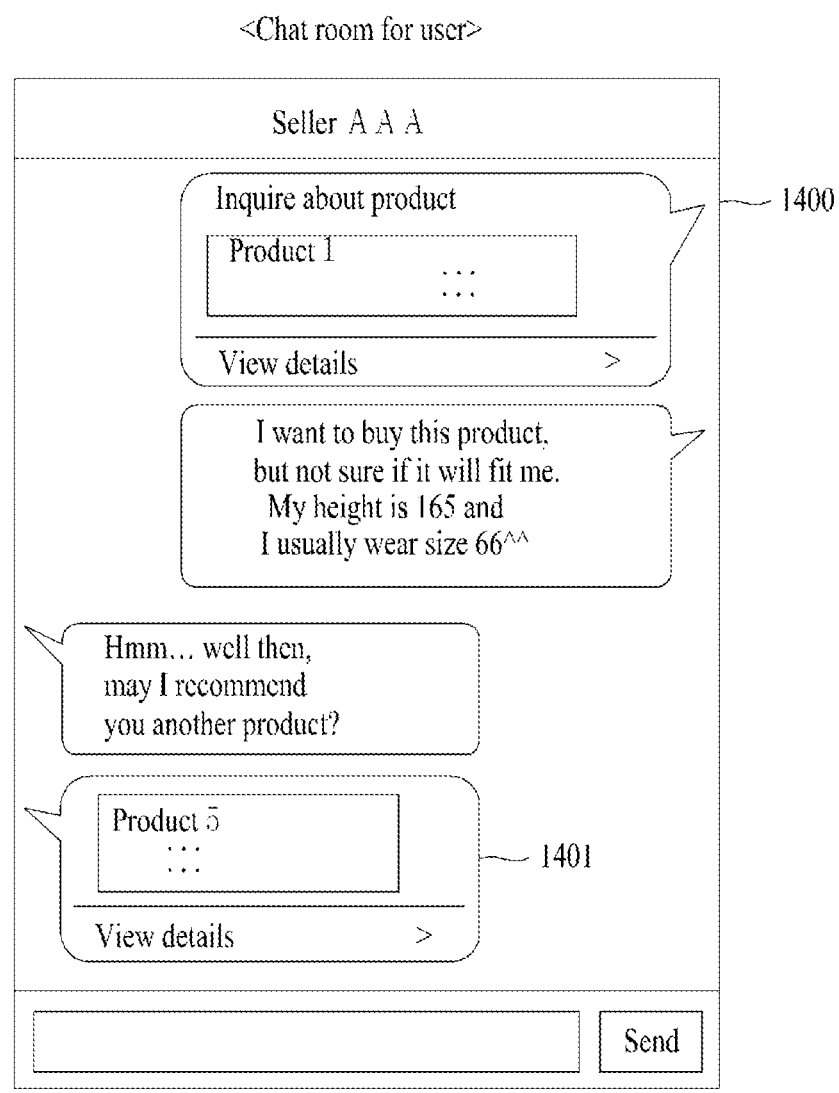

FIGS. 13 and 14 illustrate an example of a process of recommending additional products through a chat room.

Referring to FIG. 13, when a seller selects a product recommendation menu, or other UI element, for recommending other products in addition to a product linked to a chat room 1300, the chat-based ordering system may provide a product selection screen 1310 for selecting a recommending product through the chat room 1300. Here, the product selection screen 1310 may include a function, capability and/or command capable of selecting and transmitting at least one product from a list of products registered by the seller. The product selection screen 1310 may further include a function, capability and/or command of sorting products based on a variety of criteria such as a product category or popularity, sales, and a product update time and a function of searching for a product using a product name or a model name.

Referring to FIG. 14, a user may receive information 1401 about products recommended by a seller from the seller in addition to a product the user has inquired about through a chat room 1400 created between the user and the seller. Here, the information 1401 about the recommended products may include a link that may direct or connect the user to a website, for example, an individual product page, linked to the product.

Figure 15:
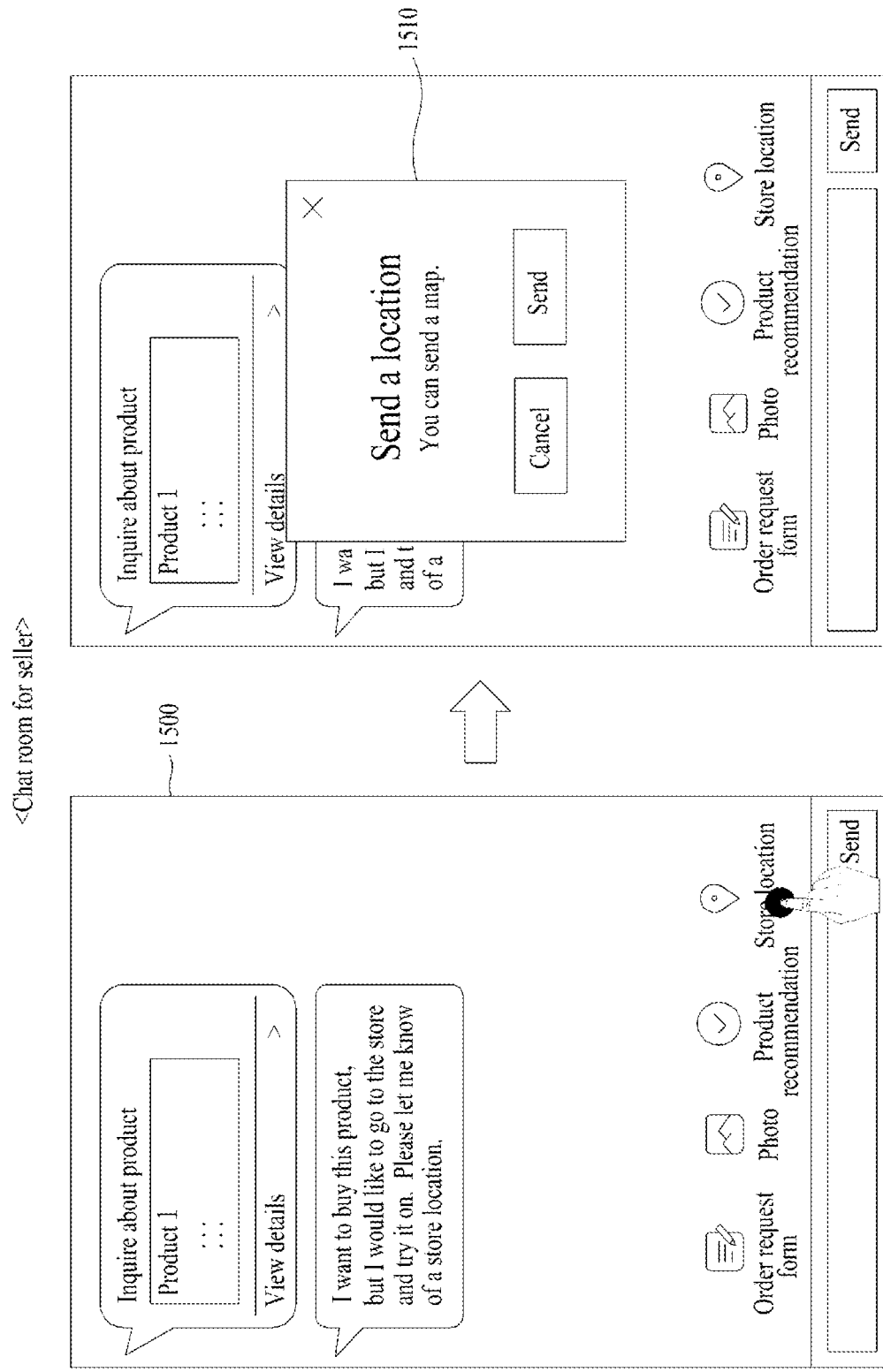
Figure 16:
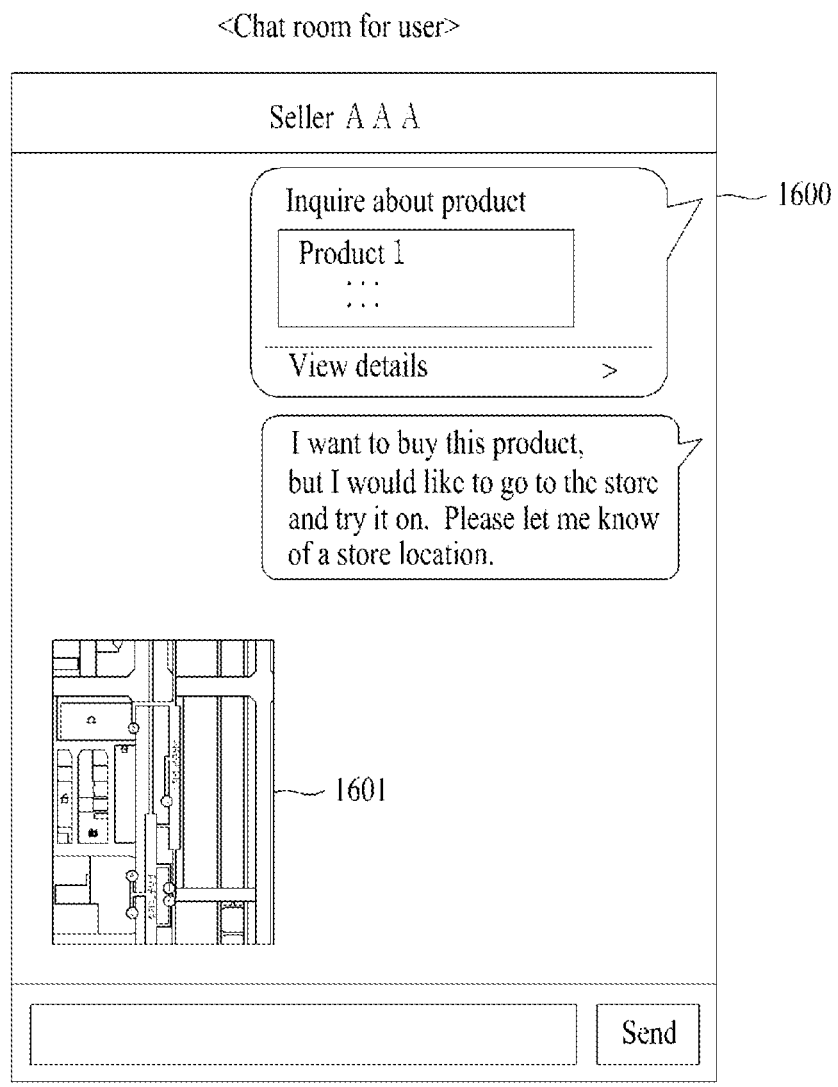

FIGS. 15 and 16 illustrate an example of a process of transmitting a store location of a seller through a chat room according to an example embodiment.

Referring to FIG. 15, when a seller selects a store location menu, or other UI element, in a chat room 1500 to transmit store location information during a product inquiry process of a user, the chat-based ordering system may provide a location transmission screen 1510 for transmitting a location through the chat room 1500. Here, the location transmission screen 1510 may provide a function, capability and/or command capable of transmitting a rough map registered in advance by the seller and a map including a store location, transmitting directions from the user's current location to the store location, transmitting the store's address, or the like.

Referring to FIG. 16, a user may receive a store location information 1601 the user has inquired about from a seller through a chat room 1600 created between the user and the seller. Here, the store location information 1601 may include a link that may direct or connect the user to a website, for example, a map website on which a corresponding location is verifiable or guidable.

Figure 17:
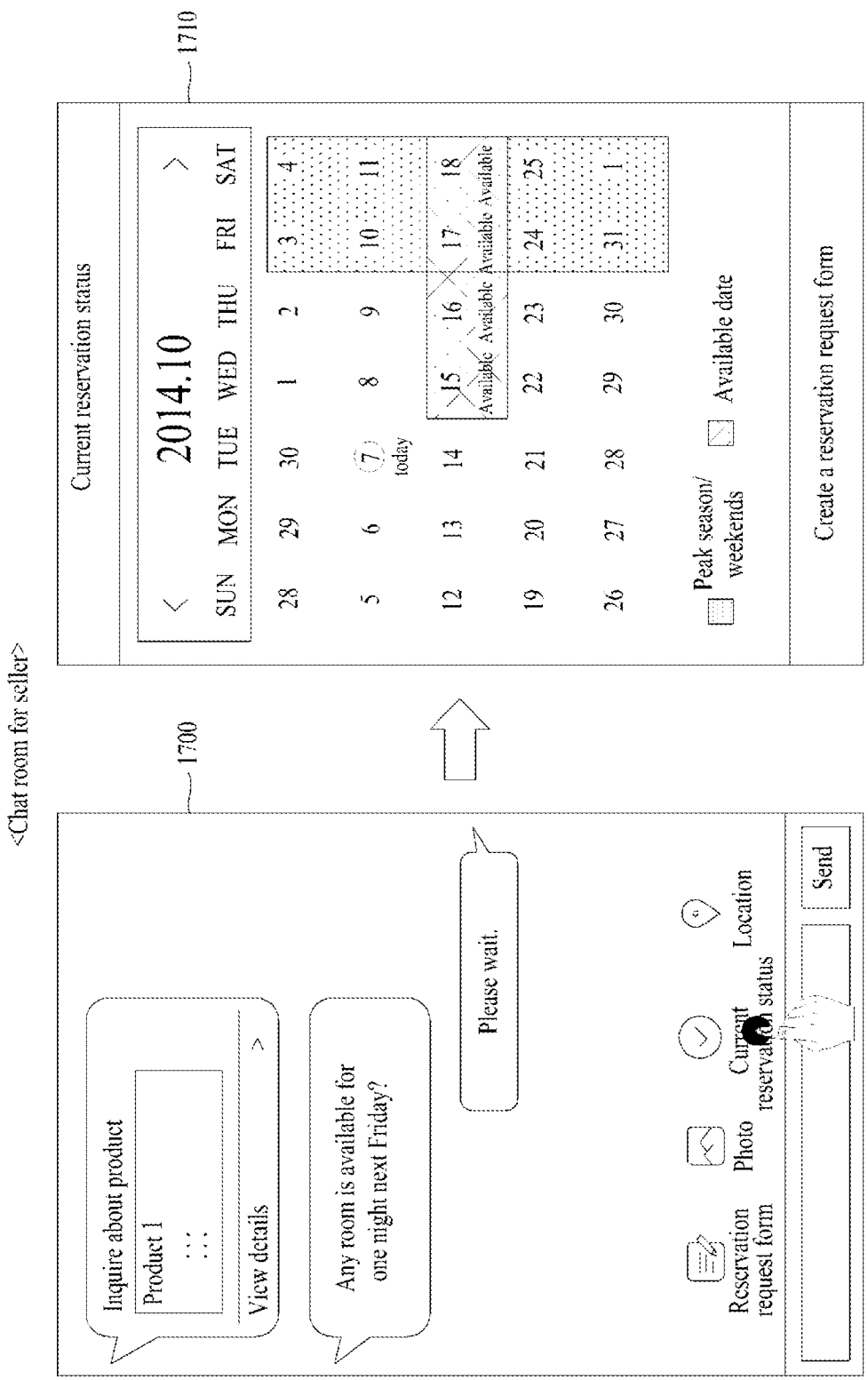
Figure 18:
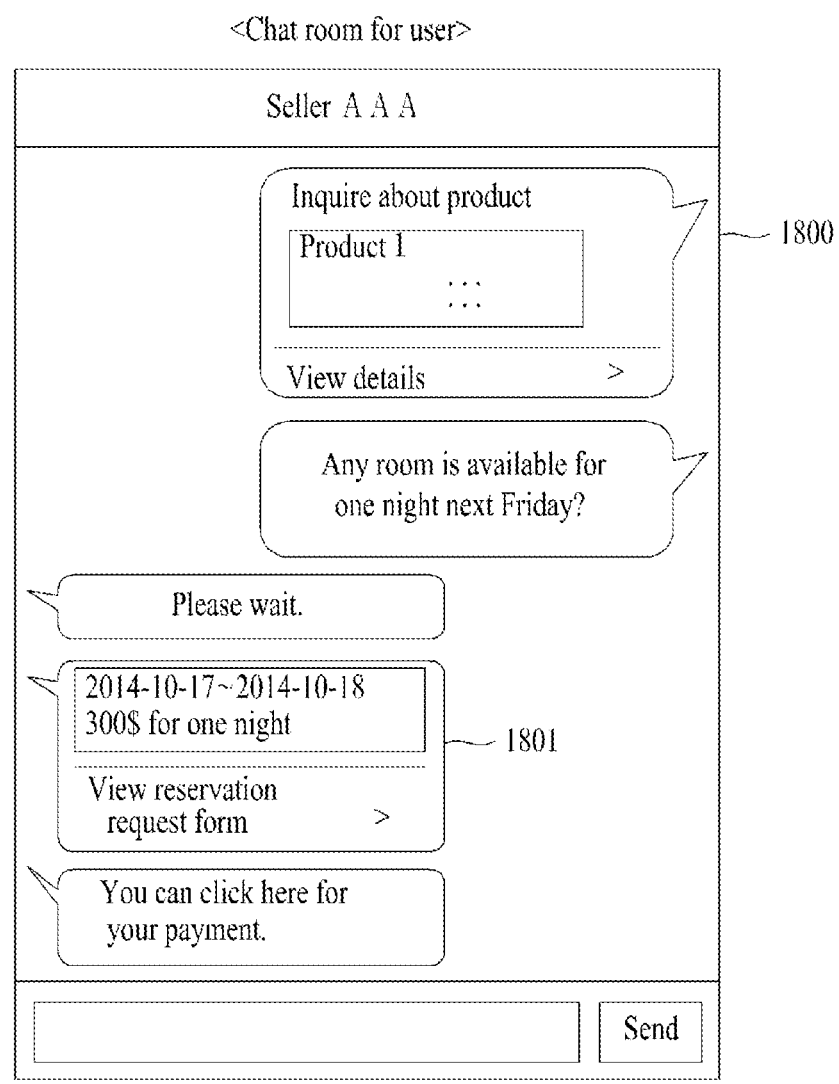

FIGS. 17 and 18 illustrate an example of a process of requesting a product order in a reservation request or form through a chat room.

Referring to FIG. 17, when a seller selects a current reservation status menu in a chat room 1700 in response to a product reservation inquiry of a user, the chat-based ordering system provides a reservation status screen 1710 through the chat room 1700. Here, the reservation status screen includes a function, capability and/or command capable of managing a current reservation status using a calendar or a schedule. The chat-based ordering system may create a reservation request (e.g., a reservation request form, or the like) that includes desired, useful, and/or required for a product reservation on an available date in response to a request of the seller through the current reservation status screen 1710 and may transmit the created reservation request to the user Referring to FIG. 18, a user may receive a reservation request 1801 of a product the user may book from a seller through a chat room 1800 created between the user and the seller, and may perform a payment after inputting information relevant to the booking process through the order request through the chat room 1800.

As described above, according to some example embodiments, it is possible to provide a chat room linked to a desired, selected, and/or predetermined product by using the product as a channel, and to create and transfer order request information (e.g., an order request form) that includes desired, useful, and/or required for a product payment through the chat room linked to the product. In addition, according to some example embodiments, it is possible to support a product inquiry, a photo transmission, another product recommendation, and a store location transmission by providing a real-time chat environment between a seller and a user through a chat room associated with a desired, selected and/or predetermined product.

The aforementioned chat-based ordering method may include a further reduced number of operations or additional operations based on the description made above with reference to FIGS. 1 through 18. In addition, at least two operations may be combined and orders or locations of operations may be changed.

Screens of FIGS. 4 through 18 refer to only a portion of service screens and are provided to understand one or more of the example embodiments and thus, the example embodiments are not limited thereto and a configuration or an order of a screen may be changed.

Figure 19:
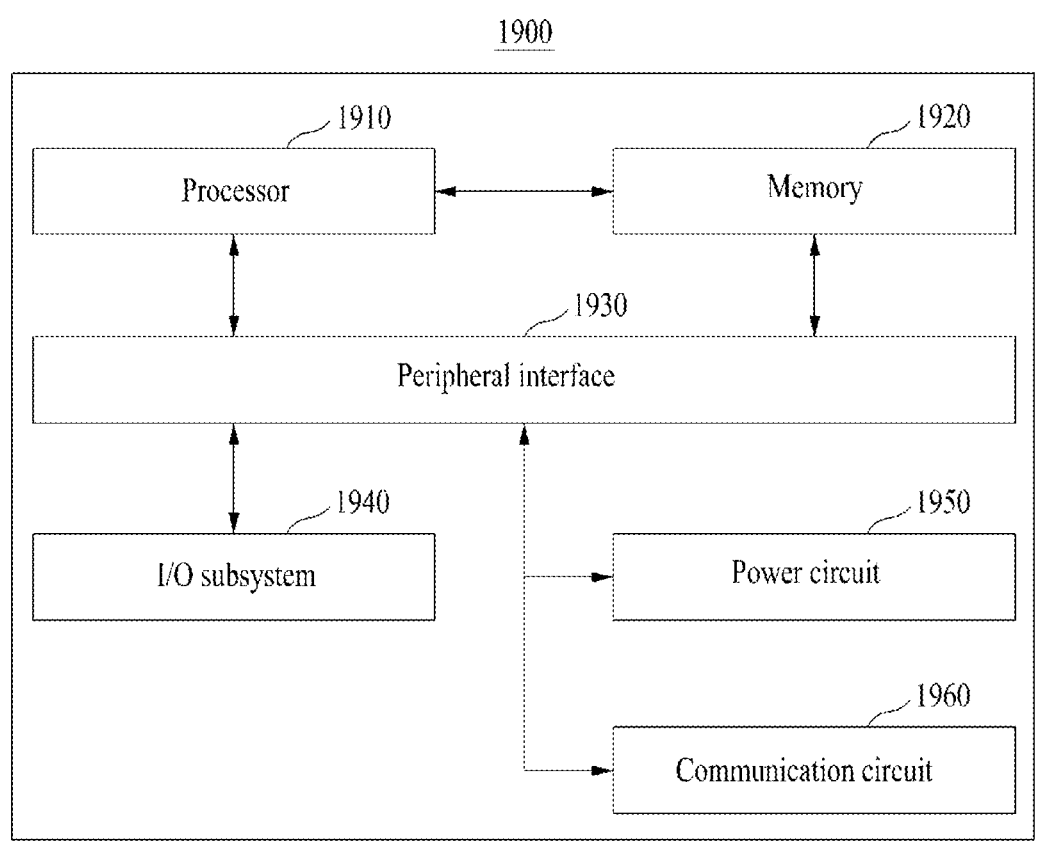
FIG. 19 is a block diagram illustrating a configuration of a computer system according to at least one example embodiment.

FIG. 19 is a block diagram illustrating an example of a configuration of a computer system 1900 according to some example embodiments. Referring to FIG. 19, the computer system 1900 may include at least one processor 1910, a memory 1920, a peripheral interface 1930, an input/output (I/O) subsystem 1940, a power circuit 1950, and a communication circuit 1960. Here, the computer system 1900 may correspond to a seller terminal and a user terminal.

The memory 1920 may include, for example, a high-speed random access memory (HSRAM), a magnetic disk, a static random access memory (SRAM), a dynamic RAM (DRAM), read only memory (ROM), a flash memory, and a non-volatile memory. The memory 1920 may include a software module, an instruction set, or a variety of data required for an operation of the computer system 1900. Here, an access from another component such as the processor 1910 and the peripheral interface 1930 to the memory 1920 may be controlled by the processor 1910.

The peripheral interface 1930 may couple an input device and/or output device of the computer system 1900 with the processor 1910 and the memory 1920. The processor 1910 may perform a variety of functions for the computer system 1900 and process data by executing the software module or the instruction set stored in the memory 1920.

The I/O subsystem 1940 may couple various I/O peripheral devices with the peripheral interface 1930. For example, the I/O subsystem 1940 may include a controller for coupling the peripheral interface 1930 and a peripheral device such as a monitor, a keyboard, a mouse, a printer, and a touch screen or a sensor depending on a necessity. The I/O peripheral devices may be coupled with the peripheral interface 1930 without using the I/O subsystem 1940.

The power circuit 1950 may supply a power to all of or a portion of components of a terminal. For example, the power circuit 1950 may include a power management system, at least one power source such as a battery and alternating circuit (AC), a charge system, a power failure detection circuit, a power converter or inverter, a power status indicator, or other components for creating, managing and distributing power.

The communication circuit 1960 enables communication with another computer system using at least one external port. Alternatively, as described above, the communication circuit 1960 may enable communication with another computer system by including a radio frequency (RF) circuit and thereby transmitting and receiving an RF signal known as an electromagnetic signal.

The example embodiments of FIG. 19 are only an example of the computer system 1900. The computer system 1900 may have a configuration or an arrangement for omitting a portion of the components illustrated in FIG. 19, further including components not illustrated in FIG. 19, or coupling two or more components. For example, a computer system for a communication terminal of a mobile environment may further include a touch screen, a sensor, and the like, in addition to the components of FIG. 19. A circuit for RF communication using a variety of communication methods, for example, wireless fidelity (Wi-Fi), 3rd generation (3G), long term evolution (LTE), Bluetooth, near field communication (NFC), and ZigBee, may be included in the communication circuit 1960. Components includable in the computer system 1900 may be configured as hardware that includes an integrated circuit specified for at least one signal processing or application, software, or a combination of hardware and software.

The methods according to the example embodiments may be configured in a program instruction form executable through various computer systems and thereby recorded in non-transitory computer-readable media. A program according to the example embodiments may be configured as a PC-based program or an application exclusive for a mobile terminal. The application according to the example embodiments may be installed in the user terminal through a file provided from a file distribution system. As an example, the file distribution system may include a file transmitter (not shown) to transmit the file in response to a request from the user terminal.

As described above, according to example embodiments, it is possible to configure a further convenient and active shopping service model by providing a chat-based ordering service starting from a product inquiry up to a product order using a one-to-one, one-to-several, several-to-one, or several-to-several chat. Further, according to example embodiments, it is possible to provide a shopping service environment that may achieve the reliability and satisfaction between a seller and a user by supporting a product inquiry, a photo transmission, a product recommend, and a transmission of a store location, and a product order through a chat room associated with a predetermined product.

The units and/or modules described herein may be implemented using hardware components, software components, or a combination thereof. For example, the hardware components may include microcontrollers, memory modules, sensors, amplifiers, band-pass filters, analog to digital converters, and processing devices, or the like. A processing device may be implemented using one or more hardware device(s) configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device(s) may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors, multi-core processors, distributed processing, or the like.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, and/or computer storage medium or device. The software also may be distributed over network coupled computer systems so that the software is stored and executed in a distributed fashion. The software and data may be stored by one or more computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of some example embodiments, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. A chat-based ordering method executed by a chat-based ordering system comprising at least one processor, the method comprising:
   displaying, using the at least one processor, a chat user interface (UI) associated with a first product of a seller on a service page on which a plurality of products including the first product are displayed;
   generating, using the at least one processor, a chat room in response to a selection of a user on the chat UI on the service page, the chat room for a chat between the seller and the user; and
   transmitting, using the at least one processor, an ordering capability function configured for at least one of the first product and at least one second product of the seller through the chat room to the user,
   the transmitting further including displaying or linking information associated with the first product on the chat room,
   automatically displaying on the chat room a link to a webpage associated with the first product as the information associated with the first product, and
   in response to a selection of the user, displaying a link to a webpage associated with the second product on the chat room by a recommendation capability function.

2. The method of claim 1, wherein the transmitting comprises:
   transmitting to the seller an order capability function configured to generate an order request for at least one of the first product and the second product through the chat room; and
   transferring the order request to the user.

3. The method of claim 2, wherein the transmitting comprises:
   transmitting to the user the order capability function configured to order one or more products in the order request using the chat room.

4. The method of claim 1, wherein the transmitting comprises:
   transmitting to the seller the recommendation capability function configured to transmit at least one recommendation information associated with other products registered by the seller to the user through the chat room.

5. The method of claim 1, wherein the transmitting comprises:
   transmitting to the seller a reservation capability function configured to manage a reservation status of the first product through the chat room.

6. The method of claim 1, wherein the transmitting comprises transmitting to the seller at least one of:
   a first capability function configured to transmit content associated with the first product;
   a second capability function configured to transmit location information associated with the seller to the user; and
   a third capability function configured to transmit reward information associated with the first product through the chat room.

7. The method of claim 1, wherein the transmitting comprises transmitting to the seller at least one of:
   a fourth capability function configured to answer a message sent from the user using a software bot; and
   a fifth capability function configured to answer the message sent from the user using a message template through the chat room.

8. The method of claim 1, wherein
   the generating further includes generating search result information related to a plurality of products responsive to at least one search keyword submitted by the user; and
   the displaying further includes displaying on the chat UI a plurality of individual product pages associated with each of the plurality of products, each of the plurality of individual product pages including information related to the respective individual product.

9. The method of claim 1, wherein the generating comprises:

generating a chat room that provides real-time chat capability between the seller and the user.

10. A non-transitory computer-readable medium including computer readable instructions, which when executed by at least one processor, causes the at least one processor to:
display a chat user interface (UI) associated with a first product of a seller on a service page on which a plurality of products including the first product are displayed;
generating a chat room in response to a selection of a user on the chat UI on the service page, the chat room for a chat between the seller and the user; and
transmitting an ordering capability function configured for at least one of the first product and at least one second product of the seller through the chat room to the user, the transmitting further including,
displaying or linking information associated with the first product on the chat room,
automatically displaying on the chat room a link to a webpage associated with the first product as the information associated with the first product, and
in response to a selection of the user, displaying a link to a webpage associated with the second product on the chat room by a recommendation capability function.

11. The non-transitory computer-readable medium of claim 10, wherein the chat room provides a message capability function to transmit messages between the user and the seller as text, video and audio.

12. A chat-based ordering system comprising:
a memory having computer readable instructions stored thereon; and
at least one processor configured to execute the computer readable instructions to,
display a chat user interface (UI) associated with a first product of a seller on a service page on which a plurality of products including the first product are displayed;
generating a chat room in response to a selection of a user on the chat UI on the service page, the chat room for a chat between the seller and the user; and
transmitting an ordering capability function configured for at least one of the first product and at least one second product of the seller through the chat room to the user, and the transmitting further including,
displaying or linking information associated with the first product on the chat room,
automatically displaying on the chat room a link to a webpage associated with the first product as the information associated with the first product, and
in response to a selection of the user, displaying a link to a webpage associated with the second product on the chat room by a recommendation capability function.

13. The chat-based ordering system of claim 12, wherein the at least one processor is configured to execute the computer readable instructions to:

transmit to the seller an order capability function configured to generate an order request for at least one of the first product and the second product through the chat room; and
transfer the order request to the user.

14. The chat-based ordering system of claim 13, wherein the at least one processor is configured to execute the computer readable instructions to:
transmit to the user the order capability function configured to order one or more products in the order request through the chat room.

15. The chat-based ordering system of claim 12, wherein the at least one processor is configured to execute the computer readable instructions to:
transmit to the seller the recommendation capability function configured to transmit at least one recommendation information associated with other products registered by the seller to the user through the chat room.

16. The chat-based ordering system of claim 12, wherein the at least one processor is configured to execute the computer readable instructions to:
transmit to the seller a reservation capability function configured to manage a reservation status of the first product through the chat room.

17. The chat-based ordering system of claim 12, wherein the at least one processor is configured to execute the computer readable instructions to transmit to the seller at least one of:
a first capability function configured to transmit content associated with the first product;
a second capability function configured to transmit location information associated with the seller to the user; and
a third capability function configured to transmit reward information associated with the first product through the chat room.

18. The chat-based ordering system of claim 12, wherein the at least one processor is configured to execute the computer readable instructions to transmit to the seller at least one of:
a fourth capability function configured to answer a message sent from the user using a software bot; and
a fifth capability function configured to answer the message sent from the user using a message template through the chat room.

19. The chat-based ordering system of claim 12, wherein the at least one processor is configured to execute the computer readable instructions to:
generate search result information related to a plurality of products in response to at least one search keyword submitted by the user; and
display on the chat UI a plurality of individual product pages associated with each of the plurality of products, each of the plurality of individual product pages including information related to the respective individual product.

20. The chat-based ordering system of claim 12, wherein the chat room is configured to transmit messages between the user and the seller as text, video and audio.

* * * * *